3,233,449
METHOD AND APPARATUS FOR ULTRASONIC TESTING OF PIPE
William C. Harmon, Chagrin Falls, Ohio, assignor to Republic Steel Corporation, Cleveland, Ohio, a corporation of New Jersey
Filed Oct. 6, 1960, Ser. No. 60,855
6 Claims. (Cl. 73—67.8)

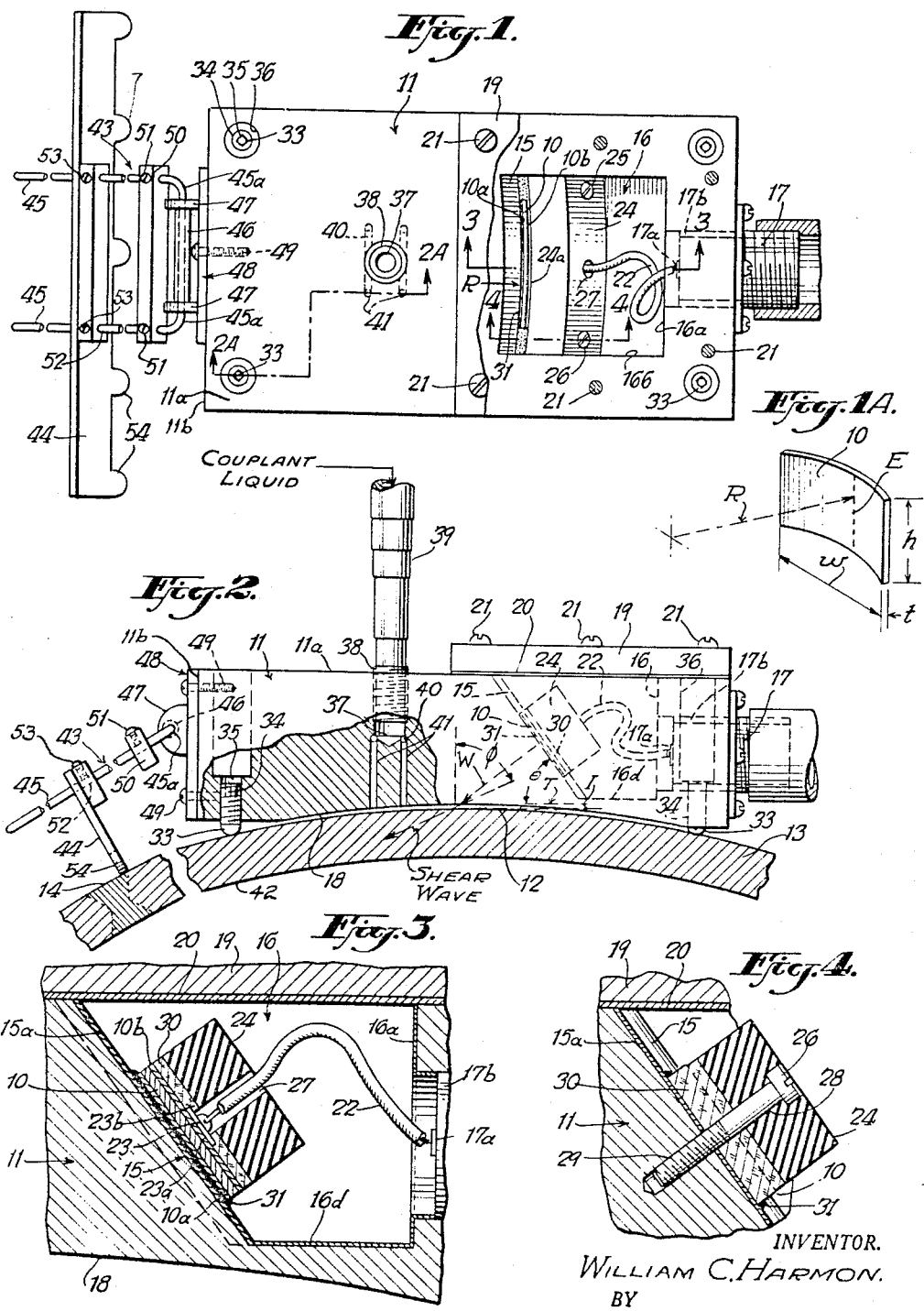
Feb. 8, 1966  W. C. HARMON  3,233,449
METHOD AND APPARATUS FOR ULTRASONIC TESTING OF PIPE
Filed Oct. 6, 1960  2 Sheets-Sheet 1
INVENTOR.
WILLIAM C. HARMON.
BY
Ward, Neal, Haselton, Orme & McElhannon
ATTORNEYS.

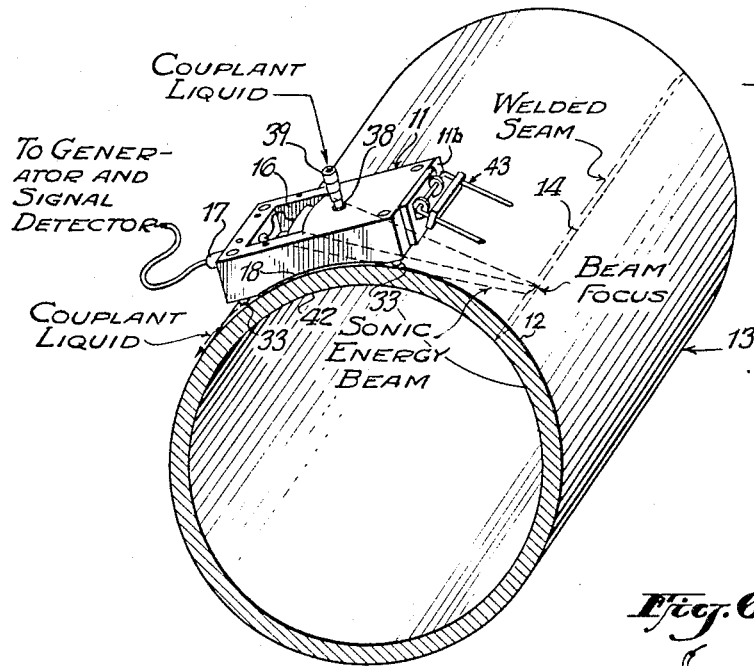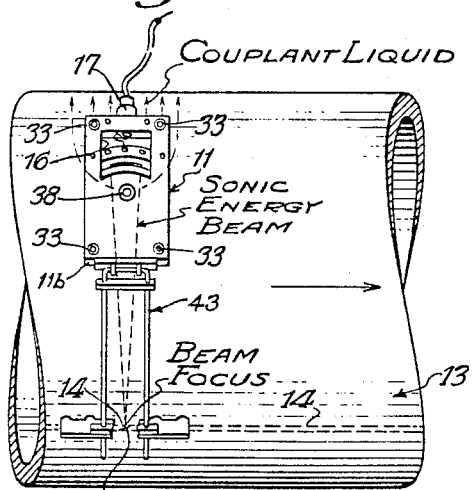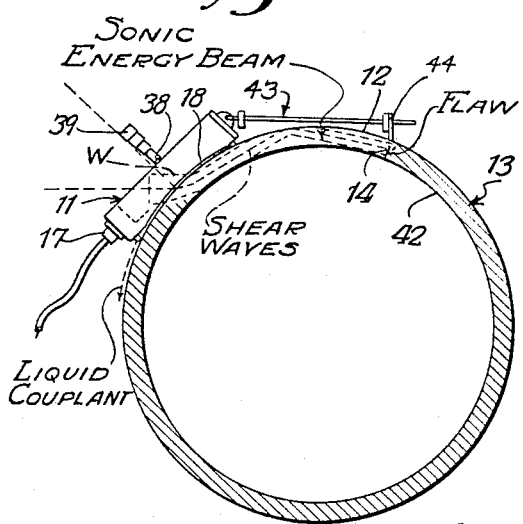

This invention relates to non-destructive testing techniques for detecting internally located and therefore invisible defects such as fissures and other discontinuities occurring in solids. More particularly, the invention relates to ultrasonic techniques employed for the purpose.

It has been found that the invention is particularly useful when applied in connected with the testing of welded seams in steel pipe to ascertain the depth of penetration, uniformity and other factors which affect the quality of the weld. It will therefore be described as adapted for such use, although it will be understood that the invention is adaptable, within the scope of the appended claims, for other purposes.

In the production of steel pipe having a welded seam, it is usually considered more conventient to ultrasonically test the weld by so-called "direct-contact" methods which do not involve either total or partial immersion in a sound-conducting liquid of the pipe section to be tested. Accordingly, the invention more particularly concerns the improvement of direct-contact type test methods, although it will become apparent that in its broad aspects the means which are provided are equally useful, when appropriately adapted, for improving so-called "immersed" test methods which are sometimes more advantageously employed under certain well-known circumstances.

For detecting internal defects in metals, ultrasonic testing techniques commonly employed are generally classified as "resonance testing," "through-transmission" testing, or "pulse-echo" testing, the principles of operation of each type being familiar to those having skill in the art. It is equally well-known that inherent limitations tend to make "resonance testing" and "through transmission" testing unsuitable for the particular use described in this application. On the other hand, pulse-echo type testing may be advantageously conducted using both direct-contact and immersed-test methods. It will therefore be understood that the forms of the invention to be described embody "pulse-echo" type principles of ultrasonic testing.

Pulse-echo type apparatus as employed in the past in connection with direct-contact methods of ultrasonically testing the fitness of pipe welds have not been completely satisfactory. One reason is that, because the apparatus inherentaly depends upon the detection of sound waves which are reflected from internal defect surfaces, previous apparatus leaves much to be desired with respect to its ability to effectively sense, and further to discriminate between wave reflections which indicate the existence of genuinely rejectable defects and those which are incidentally reflected from minor internal irregularities which are considered acceptably present inasmuch as they will in no way deleteriously affect the intended end utility of the pipe. Another reason arises by reason of naturally found characteristics of the tested product. For example, the pipe surface with which the testing instrument will be in contact is oftentimes found to be somewhat rough, whereupon it is frequently found that wear soon upsets the proper relationship between the instrument and the surface. In addition, because of their arrangement and construction, the overall sensitivity of many conventional instruments is vulnerable to impairment by the effects of spurious and extraneous electronic signals which impinge upon the transducer element.

Further reasons why these prior testing devices are believed not wholly adequate include their inadaptability for incorporation into present day mass production methods of pipe manufacture, and their susceptibility to rapid deterioration through wear and breakage in use, especially under conditions where the instrument must be placed in direct contact with the pipe section to be tested. As a consequence of these inadequacies, alternative and less efficient inspection sampling techniques may be necessarily employed, or pipe production may require periodic interruption for replacement of the ultrasonic test instrument. Production and/or maintenance costs thereupon become unduly high. Moreover, many prior devices are not considered portable.

The present invention provides portable pulse-echo type apparatus whereby acceptable and unacceptable variables in uniformity occurring within the walls of piping may be effectively detected and distinguished. Moreover, the apparatus incorporates means whereby effective coupling of the instrument with pipe surfaces is achieved under so-called direct-contact test conditions. The instrument is intended to have simple, yet relatively rugged construction to provide efficient service over an extended period of maintenance-free use. The arrangement and construction of the apparatus contemplates its use by a method which is effective to afford highly accurate results, and which is adaptable for inclusion as an integral testing step in the process of manufacturing pipe by mass production methods.

Generally describing the invention, a concave cylindrical shaped electro-sonic transducer element is angularly disposed with respect to a plane tangent to the surface of the test piece to produce a narrow, vertical pattern of concentration of the ultrasonic energy beam through the thickness of the piece at a location a predetermined distance away from the location of contact of the test instrument in which the transducer element resides. Moreover, the electro-sonic transducer element is situated wholly within a Plexiglas block so that it will never be in contact with, or immediately adjacent the test piece surface. For these reasons, it becomes apparent that the instrument may be used in testing relatively hot pipe sections immediately as they are produced, since the apparatus itself will not be untenably near the newly formed weld, for example, nor will the transducer element be subject to distortion upon contact with a heated surface. In addition, the undersurface of the Plexiglas block conforms in configuration with the intended adjacent test piece surface, yet adjustable, point-contact type leg supports are incorporated so that a uniform and extremely narrow space is provided at the proposed interface for the effective introduction between the surfaces, through small conduit apertures in the Plexiglas disposed normally to the interface, of a continuously flowing liquid couplant. It is seen that any wear of the apparatus which will normally occur during use by reason of frictional contact as the test piece and test instrument are moved relative to each other will be absorbed only by the support legs, and not by the Plexiglas block itself since frictional forces thereunder will be dispersed by the couplant liquid.

The electro-sonic transducer element is formed from any conventionally acceptable piezo-electric material, such as an X-cut quartz crystal, and is gold-plated on both sides thereof. As is well-known, its thickness will be determined by the frequency of the sound waves to be thereby produced, such frequency, in turn, being determined largely by factors such as the nature and size of the grain structure, and the anticipated defects of the material to be tested. The cylindrically curvilinear shaped transducer is mounted against the front face of a silver plated cavity within the Plexiglas mounting block, the cavity face being correspondingly curved and vertically displaced at an angle with respect to the undersurface of the block, and consequently with respect to a plane extending tangent to the test piece in direction towards that in which the ultrasonic energy will be beamed. The resulting vertically measured angular displacement of the transducer element is such that the ultrasonic waves which are initially generated thereby, as is well known, will strike the test piece surface in a manner whereby a large portion of the waves are transformed into transverse (sometimes called "shear") waves which are more usable in instruments of the kind and, further, to be refracted to travel through the test piece with direction and inclination as is most advantageous in the operation of pulse-echo systems of this type. The radius of curvature of the cavity face and transducer will determine the convergence, and therefore the location of focus within the test piece of the shear wave sonic energy.

The transducer is held in intimate contact with the cavity face by a Bakelite clamping bar which extends across the interior width of the cavity being adjustably attached, as by bolts which pass therethrough into the front face of the cavity at either side of the transducer, to exert clamping pressure on the rear face of the transducer. A cork cushion piece is interposed between the Bakelite clamping bar and the transducer so that mechanical transducer dampening can be effected simply by tightening the bolts which attach the clamping bar. Moreover, the clamping pressure is sufficient to hold an electrode contact button in intimate contact with the rear face of the transducer, the wire electrode which is attached to the button extending through a suitable, centrally located aperture formed through the clamping bar and cork cushion.

The required second electrode, contacting the front face of the transducer, is formed by the silver plating in the cavity interior, which includes the front, angulated and curved face thereof. The aforementioned wire electrode is attached to the central terminal of a suitable electrical connector mounted in the Plexiglas block so as to extend through the rearward edge of the cavity, and the silver plating, or second electrode makes electrical contact with the outer terminal of the connector. Thus, a frequency generator can be attached to the instrument to induce an alternating electrical voltage across the transducer, whereupon ultrasound will be produced at a corresponding frequency, as is well understood, which will emanate from the front face of the transducer in a beam of energy which, when introduced into the test piece, will converge and concentrate at a predetermined location.

To properly supply the liquid couplant to the space between the Plexiglas block and the surface of the test piece, the aforementioned relatively small liquid conduit apertures are disposed within the block such that the liquid will be introduced into the space from a location which is within the forward area location of ultrasound impingement upon the surface of the test piece. A short length of brass tubing mounted in the block above the conduit apertures, and so as to project from the top of the assembly, provides a suitable connection means for a supply of liquid couplant. By reason of its low cost and convenience of use, the couplant liquid is preferably water, although other liquids might also be used, such as petroleum oils (including kerosene), carbon tetrachloride, certain glycols, etc.

The entire Plexiglas mounting block, including a Plexiglas cover panel which closes the transducer cavity, is of such size as will be conveniently held in the hand for manual use and it becomes apparent that all of the apparatus required by the invention is portable in nature.

In use, the instrument will be connected to be energized by any conventional type of frequency generating and reflected signal receiving apparatus, and further will be connected, as by suitable rubber tube means, to a source of liquid couplant. In the case where the quality of a welded seam in a pipe section is to be tested, for example, the instrument will be placed against the exterior surface of the pipe, the pipe situated longitudinally with the seam extending along its uppermost side, so that the front face of the transducer element faces toward the seam. Moreover, the instrument will be placed on the pipe at a location which is below the seamed crest thereof so that, as the instrument is moved longitudinally along the pipe, the liquid couplant will always flow downwardly under the instrument and away from the direction of the weld seam. This orientation is important since any wetness on the pipe surface between the transducer and the seam will cause reflections of energy, thereby creating false indications of defects on the recording instrument.

These and other objects and features of the invention will become more readily apparent from the following detailed description of a preferred embodiment thereof, when taken with reference to the accompanying drawings in which:

FIGURE 1 is a plan view of a preferred form of apparatus built in accordance with the invention;

FIGURE 1A is a perspective view of the transducer element incorporated in the apparatus shown by FIGURE 1, to show the element in greater detail;

FIGURE 2 is a side view of the apparatus illustrated in FIGURE 1, as seen from lines 2—2 and shown partially in section taken at lines 2A—2A of FIGURE 1;

FIGURE 3 is a fragmentary and enlarged sectional side elevation of the apparatus shown by FIGURES 1 and 2, the section taken at lines 3—3 of FIGURE 1;

FIGURE 4 is a fragmentary and enlarged sectional side elevation similar to FIGURE 3, but taken at lines 4—4 of FIGURE 1;

FIGURE 5 is a perspective view showing the apparatus of FIGURE 1 as it would appear during use in testing a pipe section for internal defects at a welded seam thereof;

FIGURE 6 is essentially a plan view of the testing procedure arrangement shown by FIGURE 5; and FIGURE 7 is an enlarged side elevation of the testing procedure arrangement shown by FIGURE 5, to illustrate schematically the action of the ultrasonic energy waves.

A preferred embodiment of the sonic test apparatus provided by the invention is best understood by reference to FIGURES 1 through 4. It is there shown that an electro-sonic transducer element 10 is mounted in a transducer element mounting block 11 in a manner providing an angular disposition of the transducer element with respect to a surface 12 of the cylindrical pipe section 13 with which the apparatus will be placed in contact when conducting a testing operation for the purpose of detecting production defects occurring internally of the wall-thickness of the pipe section along the length of a welded seam 14 thereof. Transducer element 10 is firmly mounted against a mounting surface 15 of the block 11, which surface is the front face of a generally rectangular shaped cavity 16 which extends partially into the depth of the block, towards an end thereof, as shown.

The illustrated embodiment is arranged and constructed for use as a "direct-contact" type test instrument operating on "pulse-echo" sonic testing principles. Accordingly, the mounting block 11 is made of Plexiglas or Lucite, a sonically conductive methyl methacrylate polymer material which serves as a sonic coupler between the transducer element 10 and the solid body 13 to be tested. During use, the instrument will be electrically connected, through electrical connector 17, which is mounted in the rearward wall 16a of the cavity 16, to any well-known type of transducer activating electrical pulse frequency generating and receiving equipment.

As is generally understood, the connector 17 has two terminals 17a, 17b, each of which will be connected to opposite faces 10a and 10b of the transducer element, so that pulses of alternating voltage generated by the transducer activating equipment (not shown) will produce vibrations of the transducer element 10 at a frequency corresponding to that of the electrical pulse, whereupon sonic waves W will emanate from the front face 10a of the transducer element. The sonic waves are projected into, and will travel through the test body uninterrupted, except in the event the waves should strike an internally located irregularity in the test body material. When such occurs, the waves which strike the irregularity will be reflected back to the transducer element, along their original course through the test body and couplant materials, to cause vibrations of the transducer element during the lull period between the original pulse, which vibrations are detected and converted to intelligent information in the reflected signal receiving portion of the transducer activating equipment. The sensitivity of the reflected signal receiving and detecting apparatus in its ability to discriminate between acceptable variations from uniformity in the tested material and unacceptable defects occurring therein will be largely determined by the comparative strength of the signals reflected from both types of irregularities. It becomes apparent that if the beam of sonic energy as it passes through the material, at a location where occurrence of irregularities is anticipated, has a relatively large pattern, or area, the area proportions with respect to each other of acceptable and unacceptable variations will be highly indistinguishable, as measured in relation to the overall sensitivity of the apparatus (i.e., the overall ultrasonic energy concentration in the sonic area pattern). On the other hand, if the ultrasound can be densified, by beam concentration focusing of most of the ultrasound into a comparatively small area at the location of anticipated defects, ultrasound which is reflected from unacceptable defects will be distinguishable (in terms of comparative strength) from ultrasound reflected from minor and therefore acceptable variations.

Thus, for the purpose of providing discrimination between these irregularity variations, and as an example of the results afforded by the present invention as used for defect testing of a longitudinally extending weld seam of a pipe section having an outside diameter of sixteen inches (16″) and a wall thickness of one-quarter inch (¼″), the illustrated apparatus will produce a narrow rectangular pattern of sonic energy concentration measuring approximately one-eighth inch (⅛″) wide (and height according to the height of the transducer element) focussed substantially within the plane of the weld depth and oriented having the major axis of the pattern extending in direction perpendicular to the pipe axis and line of weld.

In pipe weld testing, it has been found that such vertical pattern of sonic power concentration increases the sensitivity of the testing apparatus in detecting so-called "leakers" which are defects which penetrate the tube wall and thereby constitute a most serious defect. Moreover, and as is desired, the testing apparatus will be less sensitive to generally longitudinal extending, shallow defects which do not fully penetrate the pipe wall and which are of only minor importance. Conventional test heads having flat crystal transducer elements provide opposite characteristics in the test apparatus, being relatively insensitive to "leaker" defects, and therefore are generally unacceptable for use in testing pipe welds.

Returning now to the details of construction of the apparatus of FIGURES 1–4, the transducer element 10 is formed from any piezo-electric material. However, the illustrated transducer element may be generally understood as being made of standard X-cut quartz crystal. By comparison of FIGURES 1, 1A and 2, it is seen that the crystal 10 is formed having a concave cylindrical shape generated on a radius R. This shape, in conjunction with the spacial and angular disposition of the transducer element with respect to the sonic wave contacting surface 12 of the pipe section 13 to be tested, imparts the beam focusing characteristics of the instrument. As an example of the size and shape of the transducer element, it is sufficient to indicate that in one operable form of the invention, and as illustrated in FIGURE 1A, the crystal has a height $h$ measuring seven-tenths of an inch (0.7″), a width $w$ of one inch (1″), a thickness $t$ as determined by the sonic frequency to be generated, and a curvature which measures six inches (6″) on a radius of curvature R. The radius R, of course, extends normally to all of the longitudinally extending, surface-generating elements E (one of which is indicated by dotted lines in the drawings). Four-inch (4″), eight-inch (8″) and other radii are also in use.

It is to be further observed by comparison of FIGURES 1 and 2, for example, that the transducer element mounting surface 15 has cylindrical convex curvilinear shape, generated by the same radius R so as to congruously conform to the concave face 10a of the transducer element. Thus, the transducer element will be in intimate contact with mounting surface 15 when the parts are assembled. Moreover, the mounting surface 15 resides at an angle $\theta$ with respect to the plane T which establishes the surface of the mounting block under-surface 18 in the area thereof where the centrally located waves of sonic energy will pass therethrough in being projected into the pipe section 13. The angle $\theta$ is such as will cause transducer element 10, residing at the same angle $\theta$, to project its emanated waves W towards pipe section 13 so that, after passing through the coupling interface, the waves W will strike the pipe section exterior surface 12 at an angle of incidence $\phi$ (measured from plane I passed tangent to the pipe section through the location of contact therewith of the centermost sonic waves) such as will cause the major portion of the waves W to enter and travel through the pipe section in the form of shear waves of sonic energy. It will be understood that essentially longitudinal soundwaves are emanated normally from the transducer element surface and that, upon striking another surface at an angle, they will be separated by refraction principles into their longitudinal and shear wave components. In sonic defect testing systems of this type, it has been found that the shear wave components are the more usable.

The mounting block undersurface 18 has configuration conforming with that of the test piece surface with which it will be in "direct-contact," as the term is generally employed. In the illustrated apparatus, however, the undersurface 18 will not actually be in direct contact with the pipe section surface 12 but, rather, a relatively narrow space, on the order of one- to four-thousandths of an inch (.001″–.004″), will be established between the surfaces, in a manner to be described, for the introduction of a liquid couplant. In such a case, it will be understood that, upon emerging from the undersurface 18, the sonic waves will undergo a slight amount of deflection, as they pass through the liquid couplant, before impinging upon the test piece surface 12. Thus, the angle of incidence $\phi$ is shown to be slightly different from the angle $\theta$ at which the transducer element 10 is oriented with respect to undersurface 18 although, were the instrument used in a manner whereby actual direct contact between the surfaces is established, the angle of incidence $\phi$ would be equal to angle $\theta$, and the angle $\theta$, which by the present invention is determinative of angle $\phi$, should be determined accordingly.

The amount of wave deflection which will occur upon passage through an interface formed by contact of solid surfaces with liquid surfaces, or solid surfaces with solid surfaces, and vice versa, is determined by the angle of incidence of the waves as they strike the interface and the characteristics of the respective materials, and general values thereof are readily obtainable. However, it has been determined that for the purposes intended by the present invention, best results are afforded where the apparatus is arranged and constructed so that, where "direct-contact" testing methods are employed, angle of incidence φ equals substantially fifty-three (53) degrees and, where "immersed test" testing methods are employed, angle of incidence φ equals substantially twenty-seven (27) degrees.

It now becomes apparent that, by reason of the curvilinear configuration of the transducer element 10, the angle θ of transducer element orientation with respect to mounting block undersurface 18, and the spaced relationship between the transducer element 10 and the test body surface 12 established by the relatively remote mounting surface 15, shear wave components of the sonic waves W emanated from the transducer element will travel in their optimum deflected direction through the pipe section wall and will be concentrated in a narrow pattern within a plane of the weld seam 14 extending in radial direction towards the center of the pipe section.

Turning again to the details of construction and arrangement of the direct-contact ultrasonic test instrument shown by the drawings, all of the interior walls of the cavity 16, including its front, transducer element mounting surface 15, are coated with silver. The silver plating serves several functions. On the mounting surface 15, silver plating 15a serves as an effective electrode for contacting the front face 10a of the transducer element. Being continuous around the sidewalls and the bottom wall of the cavity 16, the silver plating 16a–16d also serves as an effective conductor to provide electrical connection between transducer element front face 10a and the outer terminal 17b of the electrical connector 17. In addition, the silver plating on all of the walls of the cavity 16 effectively shields the transducer element 10 from any extraneous electrical signals which are in the vicinity of the instrument. Of course, to completely enclose and shield the transducer element 10 from such extraneous stray energy, a cavity cover plate 19, having a silver coated bottom surface 20, is held in place, as by screw means 21, to enclose cavity 16, as shown. Cover plate 19 is also made of Plexiglas or similar material.

The transducer element 10 is gold-plated on both its front face 10a and its rear face 10b to provide good electrical conducting surfaces. Thus, if the gold plated front face 10a of the transducer element is firmly held against the silver plated mounting surface 15, good electrical connection is made to the outer terminal 17b of the electrical connector 17. Similarly, if a terminal end of an electrode 22, leading from the center terminal 17a of the connector 17, is firmly pressed against the gold plated rear surface 10b of the transducer element, the transducing circuit will have been effectively completed. Referring to FIGURE 3, it is seen that effective electrical interconnection between the electrode 22 and the rear surface 10b of the transducer is provided by an electrically conductive contact button 23 attached to a terminal end of the electrode 22. A Bakelite clamping bar 24 is attached attached for pressure engagement, as by bolts 25 and 26, against both the rear surface 23b of the contact button, and the transducer element 10, itself, so that the electrical interconnection surfaces 23a, 10b and 10a, 15a respectively, will be held firmly together. Uniformly distributed clamping force is imparted to the transducer element 10 by the clamping bar 24 which has a concave cylindrical shaped front face 24a which congruously conforms to the convex cylindrical shape of the transducer element rear face 10b. The electrode 22, of course, is passed through a suitable central aperture 27 of the clamping bar 24.

To provide adjustability in dampening the vibratory action of transducer element 10, a cork cushion 30 is interposed between the front face 24a of the clamping bar and the rear face 10b of the transducer element. The bolts 25, 26 pass through bolt holes 28 of the clamping bar 24 (FIGURE 4) into corresponding bolt holes 29 drilled into mounting block 11 from the front face 15 of the cavity 16, these bolt holes being located at either side of the transducer element 10, as shown. By tightening and loosening adjustment of the bolts 25, 26, the transducer element 10 may be dampened, more or less, to effectively control the ringing of the crystal, as is well understood.

To displace all air to insure ultrasonic transmission between the contact surfaces 10a and 15a, a coating of silicone grease or the like, as generally indicated by numeral 31, is interposed between mounting surface 15 and transducer element 10. Petroleum jelly might also be satisfactorily used for this purpose.

As previously noted, the undersurface 18 of the mounting block 11 is configured in conformity with the configuration of the contact surface 12 of the solid body 13 to be tested, and the instrument can be used effectively where these surfaces are actually in direct contact with each other, provided both surfaces are relatively smooth and a couplant such as oil or water is interposed so as to produce an effective interface for sonic transmission. However, it is known that, due to wear for example, an effective interface is not always easily maintained and it is preferable to provide a positive method to interpose a liquid couplant between the surfaces. The present invention provides means for supplying such a couplant in "direct-contact" type apparatus, as will now be described.

It is seen from FIGURES 1 and 2 that four adjustable, point-contact type support legs 33 are threadedly mounted in suitable drill holes 34 of the transducer mounting block 11 in a manner such as will provide an extremely shallow space, on the order of .001–.004 inch, between the undersurface 18 of the mounting block and the test piece contact surface 12 when the instrument and the test piece are juxtapositioned. In the preferred embodiment shown, the legs 33 are rounded at their ends to provide the point-contact, and have wrench apertures 35 at their uppermost ends to provide a means for adjustment of the extent of their protrusions below undersurface 18, thereby altering the depth of the space which will be provided between the parts and which will be filled by the couplant. For protection against inadvertent misadjustment, the upper ends of the support legs 33 are recessed within appropriate bores 36 of the mounting block.

For supplying a liquid couplant, such as water, between the adjacent surfaces 18 and 12, a main couplant passage 37, such as would be formed by a drill hole, extends partially into the mounting block 11 from its upper exterior surface 11a, in a manner shown by the drawings. A short length of brass tubing 38 is threaded into the conduit opening 37 to provide a means of attachment for a rubber hose 39 or the like through which the couplant liquid will be supplied. At the base of the main couplant passage 36, horizontally extending couplant flow passages 40 are provided to lead the couplant into a plurality of comparatively narrow couplant conduits 41. The conduits 41 are formed by a series of relatively small drill holes extending upwardly from the undersurface 18 of the mounting block, as shown. Thus, a liquid couplant will be introduced through rubber tube 39 into the main couplant conduit 37 and thence through the passages 40 into the conduits 41 to emerge at the undersurface 18 of the mounting block and flow within the narrow space provided by adjustment of the support legs 33 between the instrument and the contact surface 12 of the test piece. As will be later pointed out, the direction of flow of the couplant will be towards and under the mounting block cavity 16. It should be here noted, however, that the location of couplant conduits 41 with respect to the transducer element 10 is such that the couplant will be introduced within, or at most just slightly in advance of, the forwardmost boundary of the zone of impingement of the sonic waves upon the test piece surface 12. The couplant spreads to completely fill the space between surfaces 18 and 12.

The used and mode of operation of the apparatus is best described by reference to FIGURES 5 through 7. A liquid couplant supply tube is connected to the connector tubing 38, and a transducer activating frequency generator and reflection signal detection apparatus is connected to the connector 17, whereupon the mounting block 11 and pipe section 13 are placed in contact, support legs 33 against surface 12, the instrument and pipe section oriented with respect to each other so that the sonic wave emitting face 10a of the transducer element faces towards the longitudinally extending weld seam 14 to be inspected.

Upon projection of the ultrasound into the pipe section 13, the waves will be refracted and deflected in the manner previously described and will travel through the interior of the pipe wall to the weld seam 14. During their course of travel, and as shown by FIGURE 7, the waves will be reflected upon striking the pipe wall surface boundaries, these being the pipe exterior and interior surfaces 12 and 42, respectively. Such reflection could be distorted by the presence of any liquid on these boundary surfaces in the path of the sonic waves, and false reflection signals would be received by the associated signal detection equipment. It is therefore preferable that these surfaces be kept dry during operation of the apparatus, and it is for this reason that the couplant should be introduced only within the zone of contact of the waves upon the surface 12, and the flow of the couplant should be away from the direction with respect to the instrument of the zone of sonic inspection.

It becomes apparent, therefore, that the pipe section 13 should be longitudinally disposed with its seam 14 under inspection facing upwardly, and that the mounting block 11 should be in contact with pipe section at a location about thirty to sixty (30–60) degrees measured along its perimeter away from the weld seam. Such orientation is shown by FIGURE 5.

Of course, to achieve the same effect, where the instrument is used on a flat surface of contact, the surface should be inclined slightly towards the zone thereof to be inspected.

As indicated in FIGURES 5 and 6, a beam concentration of the sonic energy waves projected into the pipe section will be produced at the location of the weld seam 14, the rectangular beam pattern extending vertically thereacross. The pipe section and test instrument are moved slowly with respect to each other so that the mounting block 11 traverses a path generally parallel to the weld seam 14. To insure adequate inspection of both sides of the weld seam 14, the mounting block 11 may be moved in forward and backward direction on the periphery of the pipe (i.e., towards and away from weld seam 14) a short distance substantially equal to the width of the weld, so that its overall pattern of movement along the pipe section 13 is effectively a zig-zag pattern.

The movement, including any zig-zag pattern thereof, and any deviation of the sonic beam from the line of weld are accurately controlled by reference to the straight edge and index means 43, which is attached to mounting block 11 to project from its forward end to the location of weld seam 14, as will now be described.

The straight edge and index means 43 comprises a straight edge 44 which is adjustably mounted on indexing rods 45, the latter being pivotally attached effectively to the mounting block. The pivotal attachment is made by insertion of the curved ends 45a of the rods within the cylindrical bearing piece 46 which extends between the bearing lugs 47 of the bearing block 48, the bearing block attached, as by screws 49, to the forward end 11b of the mounting block. A spacing bar 50 is attached, as by screws 51, to extend between the indexing rods 45 close to the pivot end thereof. The rods 45 project outwardly from the forward end 11b of the mounting block a convenient distance, about a foot or so, for conducting test operations under a variety of conditions.

The straight edge 44 has slide bores 52 for mounting the straight edge in slidable engagement on the rods 45, and clamping screws 53 for adjustably positioning the straight edge at any predetermined location along rods 45 outward from the forward end 11b of the mounting block. This distance will be determined for any given test operation by the radial distance at which it is desired that the transducer element 10 will reside away from the pipe weld seam 14, the latter distance depending upon the wall thickness of the pipe, the intended detection sensitivity of the instrument during the operation as determined by the width of the vertically disposed rectangular pattern of sonic energy which will be focused on the weld seam, and other factors. It will be understood of course, that indexing indicia might be marked along the length of one or both rods 45 for use in resetting the straight edge position therealong for a variety of recurring test conditions.

Since the underside surface of the straight edge 44 will be subject to wear by its movement in contact with the test pipe surface, a point-contact effect is achieved by providing several spaced apart protrusions 54 therealong which will be the only locations of contact between the straight edge and pipe surface. Moreover, these smaller areas of contact will substantially reduce contact friction between the surfaces as they are moved relative to one another, this feature tending to lessen the likelihood of any "binding" occurring between the contact surfaces at any location along the length of the straight edge which would cause the instrument to pivot even momentarily, out of its alignment at right angles to the pipe weld.

The function and operation of the straight edge and index means 43 will be understood by reference to FIGURES 1, 2 and 5–7 wherein it is seen that, during use, the indexing rods 45 are pivoted downwardly so that the undersurface protrusions 54 of the straight edge are in light contact engagement with the exposed surface of the pipe weld seam 14. Thus, the straight edge serves as a guide during the longitudinal movement of the test instrument with respect to the pipe section 13 being tested, assuring that the transducer element 10 remains at the predetermined desired distance radially away from the weld seam 14 throughout the test operation. If the instrument is also moved forward and backward a short radial distance corresponding to the width of the weld seam during the test operation, so that the total pattern of its movement with respect to the pipe section 13 is effectively a zig-zag pattern as aforementioned, the straight edge 44 will serve as an effective guide for such movement, assuring consistency of the pattern.

Thus, a preferred embodiment of sonic testing apparatus and a method for producing a beam concentration of sonic energy waves at a location wholly inside a solid body has been described which achieves all of the objects of the invention.

What is claimed is:

1. Portable apparatus for ultrasonic defect testing of a weld seam in a section of pipe comprising a curvilinear concaved electro-sonic transducer element for generating and projecting a focused beam of ultrasonic energy waves from its concaved surface into said section of pipe to focus at said weld seam, a sonically conductive transducer element mounting block having a forward end and further including a congruously curvilinear convex transducer element mounting surface and an underside surface for engaging a surface of said pipe section, said transducer element being mounted having its concaved face substantially against said mounting surface and said mounting surface being arranged and constructed with respect to said underside surface and forward end of the mounting block to project said ultrasonic energy waves in direction generally toward both of them, and rod-like indicator means having an end projecting from said mounting block forward end for determining the distance of said transducer element from said weld seam during a test operation, said indicator means having a transversely disposed index bar to substantially contact said weld seam during the test operation for facilitating the determination of a pattern of movement of said mounting block and said pipe section relative to each other which is substantially parallel to said weld seam so that the focal point of said focused beam of ultrasonic energy waves will at all times impinge upon said weld seam.

2. A method for testing for interiorly located defects at and within the depth of a line of weld in plate material comprising the steps of projecting a pulsed beam of ultrasonic energy into said plate material through a surface thereof from a location thereon which is at a distance away from said line of weld while directing said beam toward, and focusing said beam within said distance to provide a narrow rectangular pattern of energy concentration substantially at said line of weld and with the long side of said pattern disposed substantially normal to said plate material surface, said pattern extending across said depth of the line of weld, whereby the sensitivity of said beam to defects which extend in direction normal to said plate material surface is greater than its sensitivity to defects which extend in direction of said line of weld, and whereby upon impinging on any said defect at least a portion of said energy will be reflected back through said surface at said location, and collecting any said reflected portions of energy and converting the same into electric energy signals for use in sensing the presence of said defect.

3. A method for continuously testing for interiorly located defects at and within the depth of a longitudingally disposed weld seam in a pipe section which is moving in longitudinal direction comprising the steps of orienting and maintaining said moving pipe section so that said weld seam faces upwardly, projecting a pulsed beam of ultrasonic energy first through a solid sonic couplant and thence through a thin film of flowing liquid couplant and into said pipe section through a surface thereof sequentially from points along a locus of points which is generally parallel to and at a distance measured annularly from said weld seam while directing said beam always toward, and focusing said beam within said distance to provide a narrow rectangular pattern of energy concentration substantially at said weld seam and with the long side of said pattern disposed substantially normal to said pipe section surface, while causing said liquid couplant to flow from substantially said point locations in direction always away from said weld seam whereby the area of said pipe section surface which is disposed between said point locations and said weld seam remains free of said liquid couplant, said pattern extending across said depth of the weld seam at successive locations therealong corresponding to said sequence of energy projection points, whereby upon impinging on any said defect at least a portion of said energy will be reflected back through said surface at substantially the location thereon through which said reflected energy was initially projected, and collecting said reflected portions of energy and converting the same into electric signals for use in sensing the presence of said defect.

4. Apparatus for ultrasonic defect testing of a steel body comprising substantially direct-contact type means for producing a focused beam of sonic energy waves at a location within said steel body including a curvilinear concaved electro-sonic transducer element for generating and projecting said focused beam of sonic energy waves from its concaved surface into said steel body through a surface of the latter, a mounting block of methyl methacrylate polymer material, said mounting block including a congruously curvilinear convex transducer element mounting surface and an underside surface having configuration conforming to that of said surface of the steel body, said electro-sonic transducer element being mounted in fixed position having its concaved face substantially in surface contact engagement with the convex face of said mounting surface of the mounting block, the axially extending surface-generating elements of said curvilinear convex mounting surface and of said transducer element being disposed at an angle of substantially fifty-three (53) degrees with respect to said underside surface of the mounting block, and electrical conductor means of said mounting block electrically contacting both the said concaved face and the face opposite thereto of said transducer element for interconnecting said transducer element with a transducer activating source of electric energy, the height and curvature of said transducer element being such that said focused beam as produced at said steel body location is in the form of a narrow-width rectangular pattern having its long side disposed substantially normal to said steel body surface and spanning the thickness of said steel body.

5. A method according to claim 2 wherein said plate material is steel material, and said beam is projected by ultrasonic generating apparatus including methyl methacrylate polymer material in substantially direct contact with said surface of the steel material, said beam passing through said methyl methacrylate polymer material to incidence with said steel material surface at an angle of substantially fifty-three (53) degrees with respect to the latter.

6. A method according to claim 2 wherein said plate material is steel material, and said beam is projected by ultrasonic generating apparatus which is coupled by water to said steel material surface, said beam passing through said water to incidence with said steel material surface at an angle of substantially twenty-seven (27) degrees with respect to the latter.

References Cited by the Examiner

UNITED STATES PATENTS

| | | | |
|---|---|---|---|
| 2,527,986 | 10/1950 | Carlin | 73—67.8 |
| 2,565,159 | 8/1951 | Williams | 310—8.1 X |
| 2,814,575 | 11/1957 | Lange | 310 X |
| 2,851,884 | 9/1958 | Arenberg | 73—67.5 X |
| 2,873,391 | 2/1959 | Schulze | 310—8.3 |
| 2,953,017 | 9/1960 | Bincer et al. | 73—67.8 |

FOREIGN PATENTS 615,684  1/1949  Great Britain.

OTHER REFERENCES

McMaster, R. C.: Nondestructive Testing Handbook, Roland Press, 1959, pages 43.5–43.7 and 44.5.

RICHARD C. QUIESSER, *Primary Examiner.*

C. A. CUTTING, JOSEPH P. STRIZAK, *Examiners.*